Dec. 22, 1931. J. LAST 1,838,065
METHOD AND MEANS FOR STORING, TRANSPORTING, AND DELIVERING ARTICLES
Filed June 4, 1927 6 Sheets-Sheet 1

INVENTOR
J. Last
BY Marks & Clerk
ATTORNEYS

Dec. 22, 1931.  J. LAST  1,838,065
METHOD AND MEANS FOR STORING, TRANSPORTING, AND DELIVERING ARTICLES
Filed June 4, 1927  6 Sheets-Sheet 2

INVENTOR
JAMES LAST
BY
ATTORNEYS

Fig. 9.

Dec. 22, 1931.  J. LAST  1,838,065
METHOD AND MEANS FOR STORING, TRANSPORTING, AND DELIVERING ARTICLES
Filed June 4, 1927    6 Sheets-Sheet 6

INVENTOR
J. Last
BY Marks & Clark
ATTORNEYS.

Patented Dec. 22, 1931

1,838,065

UNITED STATES PATENT OFFICE

JAMES LAST, OF NEW ROCHELLE, NEW YORK

METHOD AND MEANS FOR STORING, TRANSPORTING AND DELIVERING ARTICLES

Application filed June 4, 1927, Serial No. 196,619, and in Great Britain March 3, 1927.

This invention relates to feeding mechanism for statistical or accounting machines and to the method of effecting the feeding from such mechanism.

The object of the invention is to provide a method and means by which a series of pliable elements of much thinner material than that which is ordinarily used for the record elements of record controlled statistical or accounting machines can be fed to such machines with certainty and with accuracy and by which articles of a pliable nature may be fed to such machines in conjunction with records of the data on or pertaining to such articles.

While the invention is applicable to the feeding of the controlling record elements to record controlled statistical or accounting machines, it is of special use in controlling the various operations in connection with pliable articles such as checks which have to go through a plurality of operations such as recording, sorting, tabulating or the like but which are of such a nature that they cannot be provided with perforations or other equivalent means enabling them to control the operations of such machines.

By the use of the present invention records in mechanical form can be provided of the data on or pertaining to such articles and such records and such articles can be fed forward in associated relation to a record controlled statistical or accounting machine and the operation of the machine consequently controlled in accordance with the data on or pertaining to such articles.

By associating checks with record members in this manner the various operations which have to be carried out in connection with checks such as recording, sorting and the like, can be expedited, effecting a great saving of time and practically effecting the complete elimination of all possibility of mistakes.

The method according to the present invention of effecting the feeding to record controlled statistical or accounting machines of elements of a pliable nature broadly consists in supporting such elements between adjacent folds of a band or bands of the material and ejecting such elements from said band or bands of material by unfolding said band or bands progressively.

The method according to the present invention of controlling accounting, sorting and similar operations on articles such as checks which are not adapted to be provided with mechanical records thereon, consists in providing a mechanical record of the data on or pertaining to each article on a member separate and distinct from such article and associating the articles with their respective records in such a manner that they can be fed in associated relation to a record controlled statistical or accounting machine.

The feeding mechanism according to the present invention for record controlled statistical or accounting machines for feeding elements of a pliable nature broadly comprises a band or bands of material adapted to support such elements between adjacent folds thereof, and means adapted to unfold said band or bands progressively to effect the ejection of said elements from said band or bands.

In order that the invention may be clearly understood reference is made to the accompanying drawings which illustrate by way of example various applications of this invention and in which :—

Figure 3^A illustrates diagrammatically a third means for associating articles such as checks with mechanical records thereof;

Figure 3^B illustrates diagrammatically a modified form of means from which pliable articles are fed to record controlled, statistical or accounting machines;

Figure 3c illustrates diagrammatically a further modified form of means from which pliable articles are fed to record controlled, statistical or accounting machines;

Figure 7 is a diagrammatic illustration of the application of a feeding means of the kind illustrated in Fig. 2 to a record controlled, statistical or accounting machine.

Fig. 8 is a diagrammatic illustration of a modified method of applying feeding means of the kind illustrated in Fig. 2 to a record controlled statistical or accounting machine.

Figure 1:
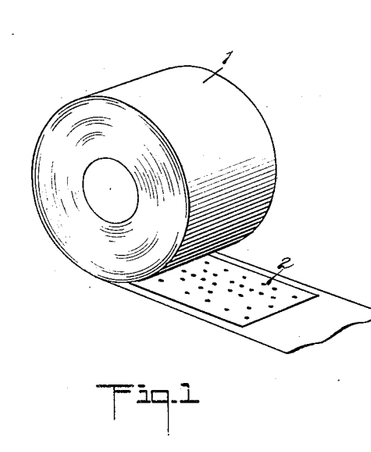
Figure 1 illustrates diagrammatically the means from which record elements are fed to record controlled, statistical or accounting machines.
Figure 2:
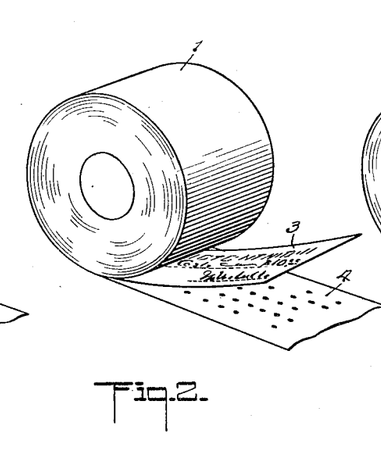
Fig. 2 illustrates diagrammatically one means for associating articles such as checks with mechanical records of the data on or pertaining thereto so that such articles may be fed in associated relation with such records to a record controlled, statistical or acounting machine.
Figure 3:
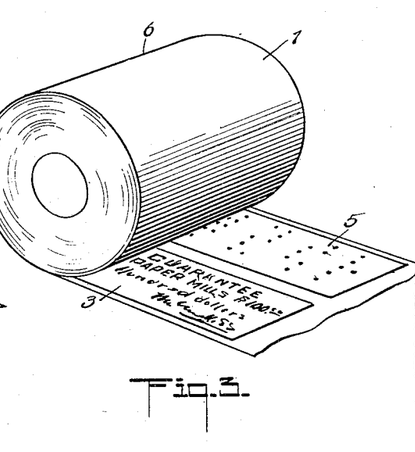
Fig. 3 illustrates diagrammatically a second means for associating articles such as checks with mechanical records thereof.

In its preferred form the feeding means according to the present invention comprises a band of material 1 wound into a roll as clearly shown in Figs. 1, 2 and 3 of the drawings. In its simplest form when used as means for feeding record elements to record controlled, statistical or accounting machines, the band of material 1 comprises a single web of a width preferably somewhat greater than the record elements 2 which it is adapted to feed. The record elements 2 are preferably made of thin pliable material of a strong texture and such elements are wound up in the roll between the adjacent layers of the roll. The record elements 2 are preferably spaced equal distances apart within the roll, and suitable means such as that hereinafter described will be provided for winding the web of material into a roll, and for feeding the record elements thereto as the web of material is being wound, either manually or automatically.

The band of material 1 illustrated in Fig. 2 of the drawings is adapted for feeding articles such as checks which are of such a nature that they cannot be provided with mechanical records therein. The checks 3 as shown in this figure are wound up in the roll in the same manner as the record elements 2 illustrated in Fig. 1. Each check wound in the roll is associated with a mechanical record 4 of the data on or pertaining thereto such record being provided according to the example illustrated, in the band of material itself. Each check will be arranged in a definite relation with the record in the band of material so that when the checks are fed from the roll in which they are wound they will be fed in association with their respective records. In the example illustrated in Fig. 2 of the drawings, the band of material in which the checks are rolled is of a width preferably slightly greater than the width of the checks and the checks are arranged in the same zone as the mechanical records provided in the band of material. The checks and the records thereof are respectively spaced apart in the roll and preferably the checks are arranged in the roll so that they coincide with their respective mechanical records.

If desired the band of material 1 may be made of considerably greater width than the check, for instance double the width of that shown in Fig. 2 of the drawings. When the band of material is of this width, the checks may be located in a zone towards one side of the band of material and the mechanical records of the data on or pertaining thereto can be arranged in a different zone towards the other side of the material in offset relation with respect to such checks.

Where the records are provided in the web of material offset from the checks, the portion of the web of material containing the records could, if desired, be made detachable from the other portion of the web of material. Further, the web of material containing the records could, if desired, be separate and distinct from that containing the articles, being wound on the same or different cores.

Where the web of material containing the records is distinct from that in which the checks are rolled, such web of material could, if desired, be made of stiffer and stronger texture than the web of material in which the checks are rolled.

In certain applications it may be more convenient to associate the checks with separate record elements and to feed such elements to the statistical or accounting machine by the conventional feed mechanism synchronizing the delivery of the record elements from the magazine in which they are stored with that of the checks from the feeding roll.

In this embodiment of the invention the capacity of each magazine is preferably equivalent to that of its associated roll and such magazine is preferably removable from the machine with such roll.

Such a machine could be adapted to deliver the record elements and the checks either to rolls of the form illustrated in Fig. 3 or to receive the record elements in a magazine or magazines and the checks in a roll or rolls associated therewith.

In Fig. 3 of the drawings the web of material 1 is shown of double width and is adaped to receive both checks 3 and record elements 5 of the data on or pertaining thereto which are separate and distinct from the band of material. In the example illustrated in this figure the checks and their respective record elements are arranged side by side in the band of material, the different pairs being preferably spaced apart longitudinally from each other equal distances.

If desired the checks 3 and the record elements 5 can be wound up in different rolls 6 and 6ª respectively as illustrated in Fig. 3. Such rolls could be provided on the same core but may be provided on separate cores so that the rolls could be readily separated to allow of the record elements or checks being fed separately to various machines.

If desired the bands of material forming the roll, especially such bands as are of the double width, could comprise two or more webs of material spaced apart with or without spacing means therebetween.

Figures 3A, 3B, 3C:
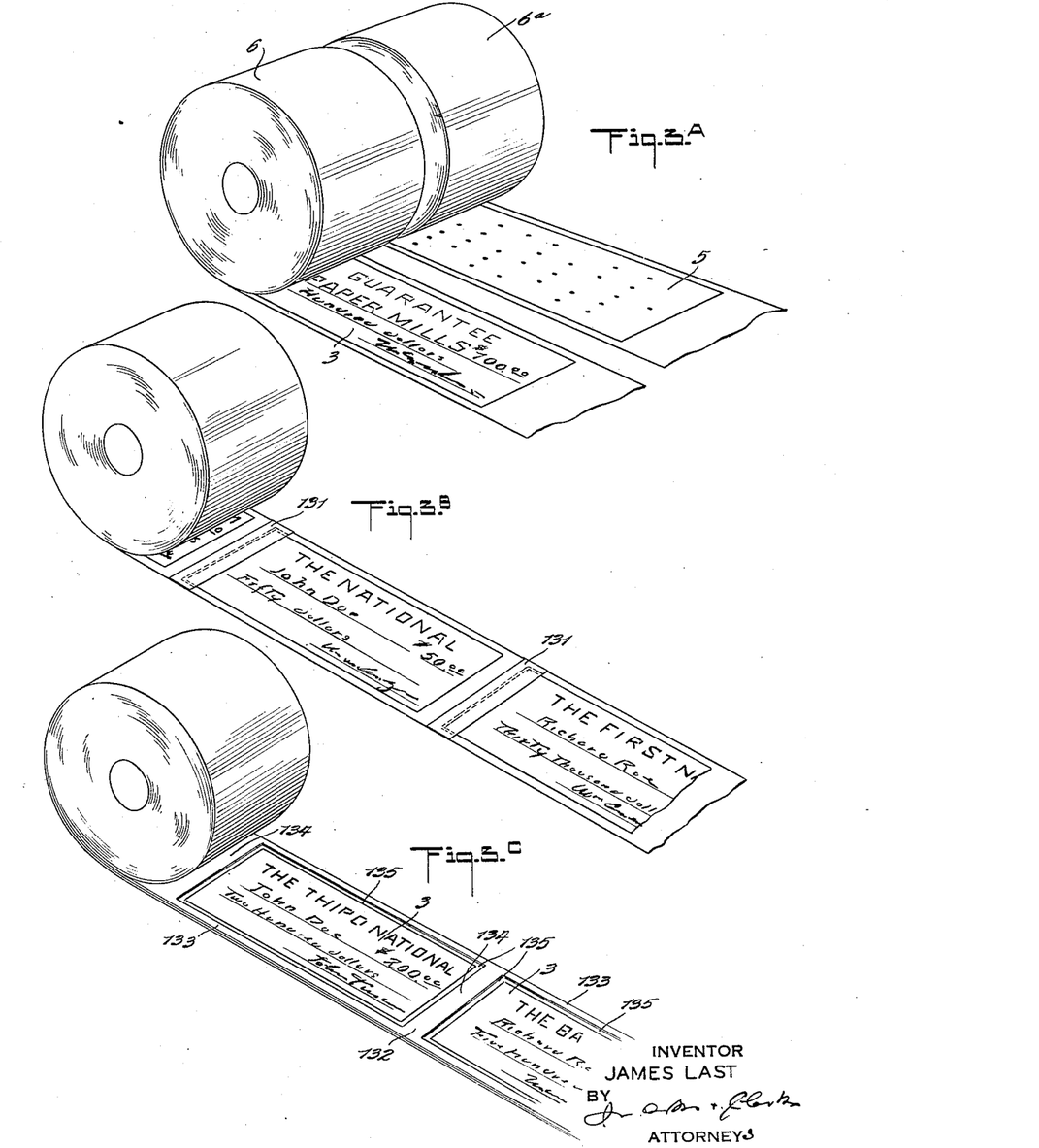

The band or bands of material could, if desired, be provided at intervals spaced apart longitudinally of the bands, with means for supporting the articles or/and records on the band, such as for instance, strips of material 131 (Fig. 3ᴮ) extending across the band and attached thereto as by pasting at their rear and side edges between each of which and the band one end of an article or record could be placed.

If desired, spacing means could be associated with the band or bands which is of such a nature that it would form in conjunction with such band or bands a series of pockets or the like adapted to receive the articles or records. Such spacing means could, for instance, comprise a band of material 132 (Fig. 3ᶜ) of a skeleton nature, that is, a band of material formed of two side strips 133 connected together at spaced intervals by means of strips or webs of material 134 so as to form a plurality of openings 135 at spaced intervals of such band of material. The size of the openings 135 so formed would preferably be somewhat greater than the size of the articles 3 which they are adapted to receive. Such band of material could be wound up with the band or bands of material between the adjacent layers of which the articles or records are supported and it would thus form pockets between adjacent layers of such band or bands of material which are adapted to receive the articles.

The articles and the record elements could be located opposite to each other on opposite sides of the band and in order to facilitate the feeding of the articles and the record elements to the band, two bands could be fed to and wound up together in the same roll. In such a case an article of a record element could be fed between the roll and the inner band and a record element or an article could be fed at the same time between the inner and outer bands.

Figure 4:
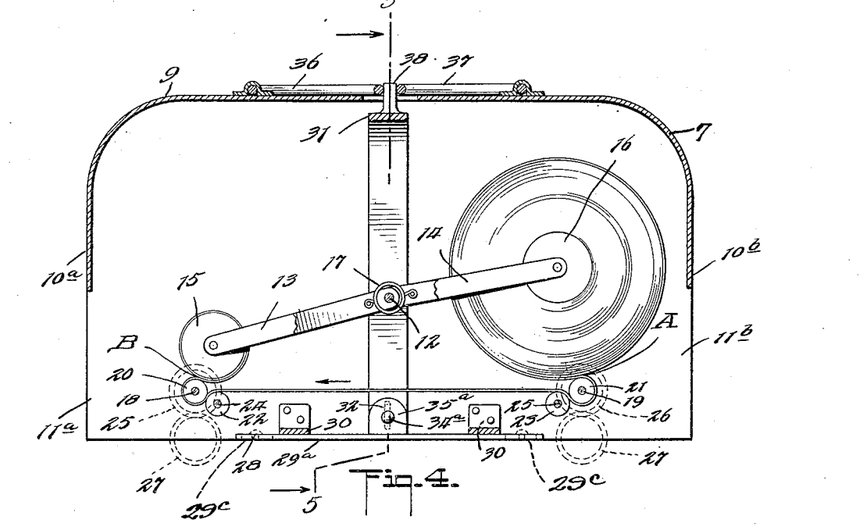
Figure 4 is a sectional elevation of feeding means of the kind illustrated in Figs. 1, 2 or 3 mounted in a feed unit adapted to be readily applied to a record controlled, statistical or accounting machine.
Figure 5:
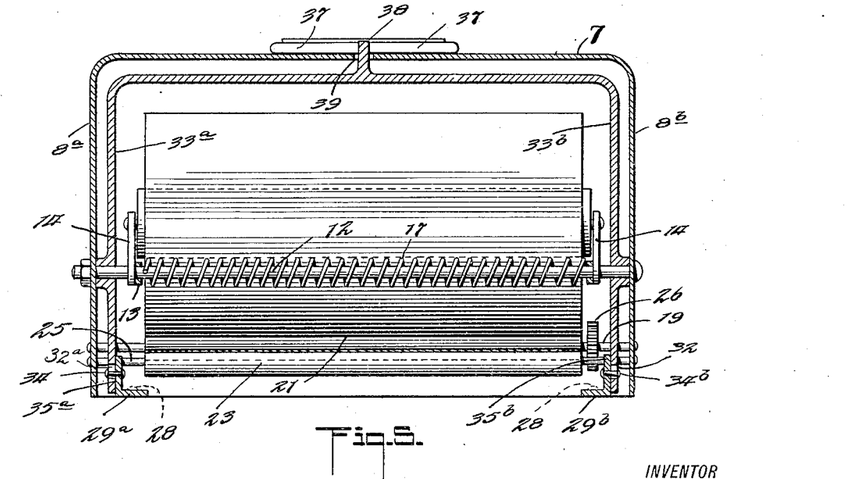
Figure 5 is a sectional elevation of the feed unit illustrated in Fig. 4 taken on line 5—5 of Fig. 4.

Any suitable feeding unit could be provided for supporting the rolls of material containing the record or/and checks or the like and any suitable means could be provided for winding or unwinding such rolls. An example of a preferred feeding unit is illustrated in Figs. 4 and 5. The supporting means illustrated in these figures is adapted to support two rolls in spaced parallel relationship so that when the web of material is unwound from one roll it will be wound on the other roll. The means illustrated in these two figures for mounting the rolls comprises a sheet metal casing 7 comprising the two side portions 8ª and 8ᵇ which are connected together by the upper portion 9 which extends downwardly at its rear and forward ends to provide the front and rear portions 10ª and 10ᵇ respectively. These front and rear portions 10ª and 10ᵇ do not extend to the bottom of the casing but are spaced therefrom so as to provide openings 11ª and 11ᵇ in the lower portions of the front and back of the casing through which the checks or/and records can be discharged or inserted. The bottom of the casing may be left open.

Mounted in the two side portions 8ª and 8ᵇ and extending between the same and located equi-distant from the front and rear ends of the casing is a rod 12. Pivotally mounted at each end of the rod is a pair of arms 13, 14. The arms of each pair extend in opposite directions and the outer ends of the arms form bearings for the two cores 15 and 16 to which opposite ends of the web of material 1 are connected. Suitable means are provided tending to turn said arms 13 and 14 about their pivots on the rod 12 so as to force the cores 15 and 16 in a downward direction. Such means could comprise a spring 17 mounted on the rod 12 and extending between the two pairs of arms, one of the ends of such spring being connected to one of the arms 14 and the other end of said spring being connected to one of the arms 13. If desired two springs could be mounted on said rod 12 so that a direct turning movement will be applied to both arms 14 and to both arms 13. Extending transversely of the casing and preferably mounted on rods 18 and 19 which are in turn mounted in the side walls 8ª and 8ᵇ of the casing are two rollers 20 and 21. Such rollers are spaced equi-distant from the two ends 10ª and 10ᵇ of the casing and are located near to the bottom of the casing in such positions that they will be engaged by the cores 15 and 16 respectively or by the rolls of material wound thereon when such cores are forced downwardly by the spring 17. The rollers 20 and 21 are respectively associated with two rollers 22 and 23 which also extend transversely of the casing. The said rollers 22 and 23 are mounted respectively on rods 24 and 25 extending between and mounted in the side walls $8^a$ and $8^b$, and are so positioned relatively to the rollers 20 and 21 that they are in rolling engagement therewith but so that they do not engage the cores 15 and 16 or the rolls wound thereon when such cores or rolls engage the rollers 20 and 21. The rollers 20, 21, 22 and 23 provide guiding and driving means for the web of paper which forms the feeding roll, such web of paper passing from the roll formed on the core 16 about substantially three-quarters of the surface of the roller 21 around substantially a quarter of the surface of the roller 23 then to the roller 22 around substantially a quarter of the surface of which it passes then about substantially three-quarters of the surface of the roller 20 to the core 15 as shown in double lines in Fig. 4 of the drawings. It will be seen from this description of the path of the web 1 that it is held in frictional engagement with the greater portion of the surfaces of the rollers 20 and 21. Such rollers therefore are adapted to act as driving means for the web of material and are preferably so used, each of such rollers being provided at one or both ends thereof with a gear 26 by which it may be driven by suitable driving mechanism on the statistical or accounting machine with which they are used. In Fig. 4 the two gear wheels 26 are shown as being in engagement with gear wheels 27. These gear wheels 27 are the last of two series of trains of gears mounted upon the machine through which the drive of the rolls 20 and 21 is effected.

Any suitable locking mechanism may be provided for locking the casing of the feeding unit in position on the machine with which it is associated.

The platform of the machine with which the feeding unit is adapted to be associated is preferably provided with a series of upstanding headed pins 28, such pins being so spaced that they can engage in key hole slots provided in two sliding plates or shoes $29^a$ and $29^b$ located respectively at opposite sides of the casing and adapted to slide beneath bearing members 30 mounted on the side walls $8^a$ and $8^b$ of the casing. Sliding movement of the members $29^a$ and $29^b$ so as to engage the headed bolts 28 in the stems of the key hole slots is effected by means of a double armed pivoted lever 31, such lever being preferably pivotally mounted on the rod 12 and having vertical slots 32 in the lower ends of the two arms $33^a$ and $33^b$ thereof. Pins $34^a$ and $34^b$ mounted respectively in lugs $35^a$ and $35^b$ extending upwardly from the members $29^a$ and $29^b$ are adapted to engage within the slots 32 respectively so that a pivotal movement of the lever 31 will impart a slight movement in one direction or another to the members $29^a$ and $29^b$. The keyhole slots in the members $29^a$ and $29^b$ are preferably double headed so that a movement of the lever 31 from the vertical position illustrated in Fig. 4 in either direction will effect a disengagement of the headed pins 28 from the stems of the keyhole slots, unlocking the locking mechanism and allowing of the feeding unit being lifted from the machine.

Handles 36 and 37 are preferably provided for lifting the device, such handles being pivoted respectively on opposite sides of upper portion 9 of the unit. The pivot of the handle 37 is preferably in line with the center of gravity of the device when the roll is wound on core 16 and the pivot of the handle 36 is substantially in line with the center of gravity of the device when the roll is wound upon the core 15. Normally the handles 36 and 37 lie flush with the top of the device and their inner ends are spaced apart such a distance that they respectively engage the opposite sides of the pin or the like 38 extending upwardly through a slot 39 in the upper portion 9 of the casing by which the member 31 is adapted to be actuated. The handle 37 will be used for lifting the device when the roll is on core 16 and handle 36 will be used when the roll is on the core 15. Since the lever 31 will operate to unlock the device when moved to either side of the vertical it can be operated when either of the handles 36 or 37 is raised, but will be locked in its locking position when the two handles lie flush with the upper portion of the casing.

To effect the winding or unwinding of the feeding roll, it will be preferable to rotate both rollers 20 and 21, though if desired only one of such rollers may be rotated namely the one associated with the core on to which the web is being wound.

Presuming that the roll mounted on the core 16 encloses a plurality of records, or checks, or both, between its adjacent layers, then, when the web is unwound therefrom by rotating roller 20 or both rollers 20 and 21, the articles will be discharged at the point A where the web of material leaves the roll and passes around the roller 21.

Presuming that the roll on the core 15 is empty and it is desired to fill the same with a plurality of records, of checks, or both, the roller 20 or rollers 20 and 21 will be driven, thus winding the web on to the core 15 and the records, or checks, or both, will be fed into the roll at the point B where the web of the roll passes from the roller 20 to the roll on core 15.

In some cases, especially when the checks are being first fed into the roll and the records thereof are being made, it may be necessary to wind the web intermittently. This can easily be effected by suitable control of the driving mechanism.

Figure 6:
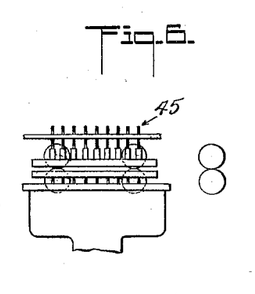
Figure 6 is a diagrammatic illustration of the application of feeding means of the kind illustrated in Fig. 1 to a record controlled, statistical or accounting machine.

The feeding mechanism according to the present invention as applied to an accounting and tabulating machine of the known type is shown diagrammatically in Fig. 6 of the drawings. In this figure the feeding roll 40 containing a plurality of record elements as illustrated in Fig. 1, is mounted on the core 16 and positioned so as to discharge the record elements 2 and deliver them to receiving rolls 41 and 42 from which they are passed between the two pairs of rotating feed rolls 43 and 44 to the sensing mechanism 45 of the machine. The record elements after being passed through the sensing mechanism are dealt with in the usual manner according to the type of machine of which the sensing mechanism is a part. If desired the machine could be adapted to discharge the records to a roll corresponding to that of the feeding mechanism.

When checks or similar articles are wound up in a roll containing therein mechanical records of the data on or pertaining to said checks as illustrated in Fig. 2 of the drawings the mechanical records on the roll can be used for controlling such operations as posting or the like, in which it is not necessary to alter the order of the checks. This method of storing the checks while not so convenient as that disclosed in Fig. 3 of the drawings since the various records are provided in continuous form is of considerable use and two applications are illustrated diagrammatically in Figs. 7 and 8 of the drawings. The mechanism illustrated in Fig. 7 of the drawings is one by which the checks stored in the perforated record roll are discharged from said roll and transferred to a second roll formed of a plain band of material while the perforated record roll is transferred from one core to a second core after passing through and controlling suitable posting mechanism. In this figure the perforated roll with the checks stored therein is shown at 90, such roll being associated with a driving roller 91 and a friction roller 92. On rotation of the driving roller 91 the perforated web will be unwound from the roll 90 and the checks will be discharged therefrom in the direction of the arrow to the rotating feed rolls 93 which transfer them to a roll which is being wound on core 94 driven by the driving roller 95. The band of material being wound on the core 94 is drawn from the roll of material 96, such roll of material passing about the rolls 97, 98 and 99 to the driving roller 95. The perforated web as it is withdrawn from the roll 90 is passed through suitable sensing mechanism 100 which is adapted to control suitable posting mechanism not shown, and from thence it passes to the roll 101 upon which it is wound by means of the driving roll 102.

By means of this mechanism a tabulated record of the data on or pertaining to all the checks wound in roll 90 can be obtained but the record web will be separated from the checks. The record web, however, can at any time be used for obtaining a further tabulated record of all the checks which were originally wound up in the roll 90.

In Fig. 8, mechanism has been illustrated by which a tabulated record of the data on or pertaining to the checks mounted in the perforated roll can be obtained and the checks rewound with the perforated web. In this figure the perforated web from the roll 105 is fed through sensing mechanism 106 corresponding to the sensing mechanism 100 of Fig. 7 and is then passed about the guide roll 107 to a driving roll 108 and storage core 109 upon which it is adapted to be wound. The checks fed from the roll 105 are guided by means of a series of feeding rolls 110 and a guide plate 111 to the perforated web as it is being wound on the core 109 and are wound therein.

The discharging of the checks from the rolls 90 and 105 in the manner described in connection with Figs. 7 and 8 may be effected intermittently depending upon the type of sensing mechanism with which it is associated.

Provision will have to be made in the arrangement illustrated in Fig. 8 of the drawings for ensuring that the checks are delivered to the roll 109 in correct association with the records thereon. This may be effected for instance by controlling the speed of the checks in their travel between the rolls 105 and 109 or by arranging that the paths of travel of the checks of the record band are equal in length.

If the mechanical records in the band of material in which the checks are wound is offset with respect to said checks then the checks can be fed forward in parallel relation with the perforated web through the posting machine to the winding roll.

Figure 9:
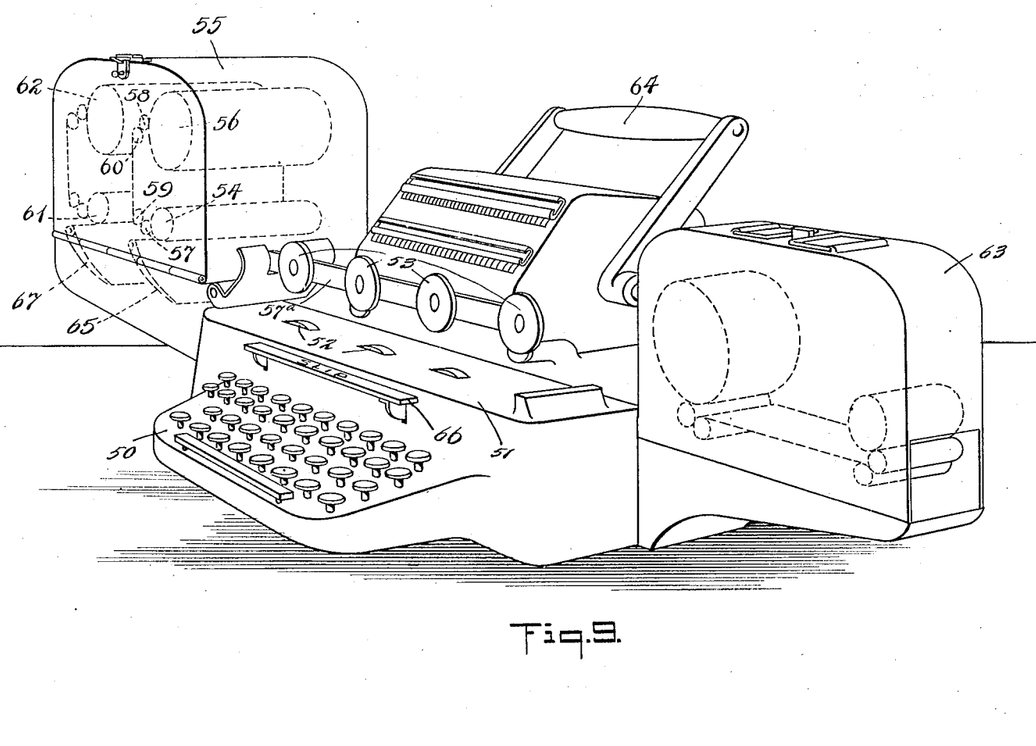
Fig. 9 is a perspective view of a recording machine adapted to be used for supplying checks and mechanical records of the data on or pertaining thereto, a feeding means of the kind illustrated in Fig. 3 of the drawings.

As previously stated, when checks or other similar articles are wound in the feeding rolls with record elements of the data on or pertaining thereto, such checks and record elements can be fed to the roll manually. The records on the record elements may be provided by any well known means prior to being fed to the rolls and then fed to the rolls with the checks manually. It is preferable, however, to use mechanical means for feeding both the checks and the record elements to the rolls and a machine for effecting this object is illustrated in Fig. 9 of the drawings. This machine comprises a keyboard 50 by which the data on or pertaining to the checks or other articles can be set up on punching mechanism of any well known type located in the central portion of the body of the machine at the rear thereof. The checks from which the data is to be obtained are laid one by one on the platform 51 immediately to the rear of the keyboard 50. Projecting slightly through openings in this platform are a number of rollers 52 which are adapted to be rotated intermittently and to co-operate with rolls 53 to effect the feeding of the checks to a feed roll 54 mounted in a casing 55 on the left hand side of the machine. The feed roll 54 is part of a unit corresponding to that illustrated in Fig. 4 of the drawings and the web of material into which the checks and record elements are to be wound is fed on to the feed roll 54 from the roll 56. The two rolls 54 and 56 as illustrated in Fig. 9 are located one above the other instead of in horizontal arrangement as illustrated in Fig. 4 of the drawings and they are associated with friction rollers 57, 58, 59 and 60 corresponding to friction rollers 20, 21, 22 and 23 of the element illustrated in Fig. 4.

The two rolls 54 and 56 are located in vertical arrangement so as to provide a space for a corresponding unit similarly arranged in the left hand side of the casing 55. The purpose of this unit which comprises the feed roll 61 and the roll 62 is hereinafter described.

The material on which the punched record is to be provided is adapted to be fed to the punching mechanism from a feed roll mounted in the casing 63 on the right hand side of the machine in a plane to the rear of the platform 51. Such material may have been previously cut to size and may be fed from a feed roll mounted in the casing 63 corresponding to the feed roll illustrated in Fig. 4 of the drawings. Preferably however, the material is in the form of a web and is fed in this form preferably by a frictional drive to the punching mechanism. The material will be positioned in any well known manner in correct relation with the punching mechanism and when the punching mechanism has been set in accordance with the data on or pertaining to the check lying on the platform 51, the handle 64 will be operated thereby effecting by any suitable means the punching of the material and at the same time, cutting the record element into the desired length. The forward movement of the handle 64 will preferably store energy in a spring (not shown) and will cause the bracket 57ª on which the rolls 53 are mounted to be pressed downwardly so that the check lying on the platform 51 will be gripped between the rolls 52 and 53. On the return movement of the handle 64 the spring in which energy has been stored will be released and will effect the driving of the rolls 52 and also of mechanism adapted to feed the punched record element from the punching mechanism to the feed roll 54. The feeding of the record element by this feeding mechanism will be effected in unison with the feeding of the check from the platform 51.

The rolls 57 and 58 will also be driven in unison with the rolls 52 so that as the check and the record element are fed to the roll 54, the receiving web therefor will be wound on the roll 54 and will consequently wind the check and record element therewith.

The checks and record elements are guided to the feed roll 54 by the curved plate 65. This plate 65 is adapted to be moved out of the path of the checks and record elements if desired by pressing the bar 66 downwardly. This operation is effected when it is desired to feed articles to the feed roll 61, which is the case when it is desired to keep a record of bank deposit slips or the like on which various checks have been entered. When a deposit slip is placed on the platform 51 a record of this slip will be made and then the slip together with its record will be fed to the left by the mechanism previously described. The guide plate 65, however, will have been removed from the path of these slips and of their respective records by the operation of the bar 64 and such slips and their records will be guided by means of the guide plate 67 to the roll 61. The operation of the bar 66 is also adapted to transfer the drive from the roll 54 to the roll 61 or merely to connect the roll 61 to the driving mechanism.

The rolls 53 are mounted on the pivoted bracket 57ª so that they can be readily raised to allow of a check being placed on the platform 51 after the previous check has been fed to the roll 54.

By a machine of this form it will be seen that records of data on or pertaining to checks or other like articles can be readily made on separate elements and then fed forward mechanically in associated relation with such checks to a feed roll in such manner that there will be no danger of the correct alignment of the checks and their record elements being disturbed.

For some purposes it may be desirable to feed the record elements to the roll 54 in conjunction with a web of material containing perforated records or the like corresponding to those in the record elements. Such perforated web could be wound up with the roll 54 together with the record elements and the machine above described could readily be adapted to punch holes both in the record elements and in the web of material and then to cut the record elements to size from one web without cutting the other web.

If double records of this nature are provided, the web containing the perforated record could at any time desired be unwound from the roll 54 and separated from the record elements which latter could be wound on another roll in associated relation with the checks. Such web containing the perforated record could then be stored and used at any time for controlling record-controlled accounting machines for obtaining a tabulated list of the data on or pertaining to the series of checks of which such web is a record.

It will be readily appreciated that the machine above described could be adapted for providing a perforated record of data on or pertaining to a series of checks in a single band of material and of winding the checks corresponding with such record in such band of material to form a roll of the kind illustrated in Fig. 2 of the drawings, either with the records offset with respect to the checks or otherwise.

Figure 10:
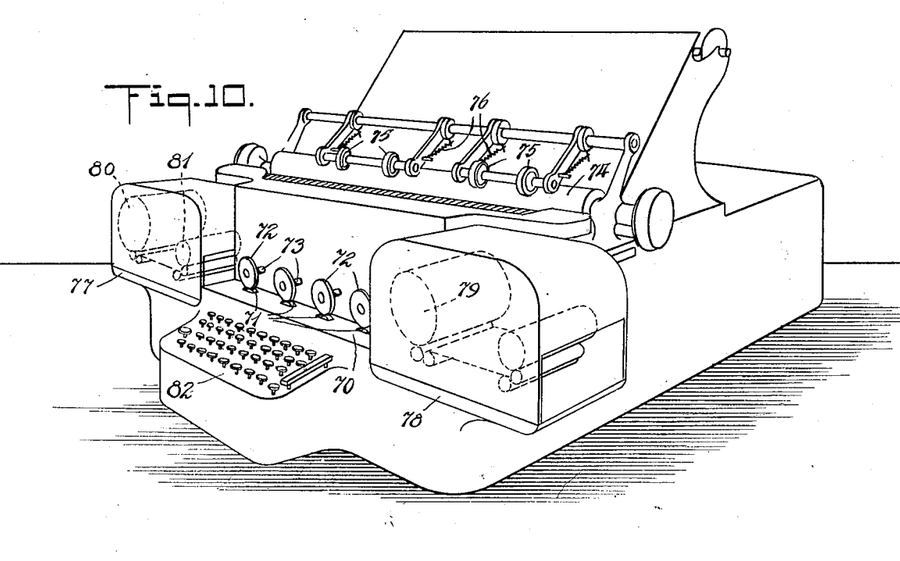
Fig. 10 is a perspective view of a machine for posting checks or the like which is adapted to be used with feeding means of the kind illustrated in Fig. 3.

A further application of this invention is illustrated in Fig. 10 of the drawings in which a machine for posting checks is shown. Arranged centrally of the machine toward the front edge thereof is a platform 70 through which a number of rollers 71 slightly project. Engaging these rollers 71 are a plurality of rollers 72 which are rotatably mounted on studs 73 projecting from the face of the machine. The rollers 71 are driven by suitable mechanism not shown and the rollers 72 may be driven or not as may be desired. To the rear of the platform 70 suitable sensing and posting mechanism of any known type is arranged, the sensing mechanism being adapted to sense the mechanical records passed therethrough and being adapted to control the operation of the posting mechanism so that the data recorded on the recording element is transferred in tabulated form to a sheet of paper passing around the roller 74. The sheet of paper is held against the roller 74 by any well known means such as rollers 75 which are held in resilient engagement with said roll 74 by the spring 76. Located on opposite sides of the machine are two platforms 77 and 78 upon which feeding units of the kind illustrated in Fig. 4 may be mounted. Such platforms are preferably provided with upwardly projecting pins corresponding to the pins 28 described in Fig. 4 so that a feeding unit can be readily clamped to each platform.

The feeding unit mounted on the platform 78 contains a full roll 79 having checks and record elements arranged between adjacent layers thereof and spaced apart transversely of the roll as illustrated in Fig. 3 of the drawings. The roll 80 of the feeding unit which is mounted on the platform 77 is adapted to receive the checks and record elements after they have been fed through the machine and merely comprises a band of material with no checks or record elements between adjacent layers thereof. This roll is adapted to be wound on to the core 81 so as to receive the checks and the record elements fed from the roll 79. The plane of the machine in which the feeding mechanisms are mounted on the platforms 77 and 78 is such that the side of the roll 79 from which the checks are discharged is aligned with the rollers 71 and 72 so that as the checks are discharged from the rolls 79 they will be passed on to the platform 70 and received between the rollers 71 and 72. The sensing mechanism which controls the operation of the posting mechanism is located so that the record elements discharged from the rear side of the roll 79 will be fed thereto.

Any suitable driving mechanism may be provided for the machine, which is adapted to rotate the rollers 71 and 72 in unison with the driving rolls of the feed mechanisms mounted on the platforms 77 and 78 and with the feed mechanism for the record elements and which will effect the operation of the sensing and posting mechanism at the correct intervals. In operation the associated checks and record elements will be fed successively from the feed roll 79. When the record elements are correctly positioned in the sensing mechanism (which will be effected in any well known manner and which will occur when a check is within view of the operator on platform 70) the operation of the sensing and asssciated mechanism will be commenced, the operation of the feed mechanism for the checks and record elements being stopped or not, dependent on the type of sensing mechanism which is used. By the operation of the sensing and associated mechanism, the record on the record elements will be transferred to the sheet of paper passing around roll 74, and on the completion of such operation, the feed mechanism for the record elements and the checks will cause the record element which has just been sensed and posted, to be fed forward in conjunction with the check on the platform 70 to the feeding unit on the platform 77 where they will be wound in the roll on the core 81.

It will thus be seen that the data on or pertaining to the checks mounted in the roll 79 will be posted in tabulated form on the sheet passing about roll 74 and the checks with their record elements successively fed into the roll on the core 81. Thus after the emptying of the roll 79 and after complete posting of the checks which were previously stored therein, the checks and their record elements will be stored in the roll on core 81. The feeding unit mounted on platform 77 can then be removed and the records and checks stored therein fed to other machines whereby the records can be used for controlling any further operations which may be desired in connection with the checks stored in such unit.

The machine illustrated in Fig. 10 is provided with typewriter keyboard mechanism 82 by which any further data may be inserted on the posting sheet which may be desired either after the whole of the checks from roll 79 have been posted or at any period of the posting operation which may be desired.

The feeding mechanism according to the present invention can be used for controlling sorting machines of any well known general type which are adapted to sort a series of record cards according to data thereon, by substituting feeding mechanism of the kind described with reference to Fig. 1 for the feeding mechanism of such machines.

If feeding means of the kind illustrated in Fig. 3 of the drawings is to be used for controlling sorting machines it will be necessary to adapt such machines for using such feeding mechanism since the essential idea of such mechanism is that the record elements are fed in associated relation with the checks or the like of which they form the record.

It is also preferable when sorting checks or the like to maintain them in associated relation with their record elements after sorting, so that when such checks or the like have been sorted, they can be put through further operations such as accounting or the like, which can be automatically controlled by the record elements.

Figure 11:
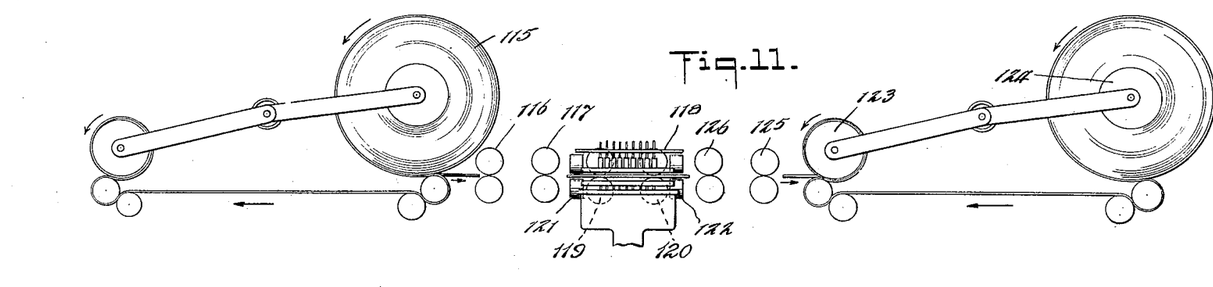
Fig. 11 is a diagrammatic view of the application of feeding means of the kind illustrated in Fig. 3 of the drawings to a sorting or like machine.

Means for sorting checks and at the same time maintaining them in associated relation with their associated records is illustrated diagrammatically in Fig. 11 of the drawings, such means being described herein as being arranged for decimal sorting, digit by digit, in the customary manner. The checks and their associated record elements are stored in the roll 115 of a feeding unit such as is illustrated in Fig. 4 which is mounted at the side of the machine in a convenient relation to the first station. The said checks and record elements are transferred from the feeding unit transversely with regard to the length of the machine by the feeding rollers 116 and 117 first to a sensing mechanism 118 related to the first station. This sensing mechanism is provided with feed rollers 119 and 120 which are adapted to discharge in the same direction as that of the feed (namely, transversely) all such elements whose recorded designating digit is zero, together with their associated checks, to an unfilled feeding unit, of the type illustrated in Fig. 4 (comprising cores 123 and 124), but is also provided with further feed rollers 121 and 122 by which any record whose designating digit is not zero will be delivered together with its associated check in a direction at right angles to that of the transverse feed, to an adjacent sensing mechanism related to a second station. The second station is in turn associated with a related unfilled feeding unit. Similarly the other stations in turn arranged in succession longitudinally in the machines comprise a sensing device related to the station and an unfilled feeding unit. Generally, the result of the operation of any sensing unit is either to cause transfer of the record sensed, together with its associated check transversely to the feeding unit associated with the station or longitudinally to the next sensing unit in succession. The feeding operation completed according to one column of the designation, the feeding unit from which the records and checks have been delivered is removed and the feeding units which have received the sensed records and their associated checks according to their designation respectively are in their turn employed as feeding units to the first station and delivering to a further set of unfilled feeding units on the opposite side of the machine according to the digits in the next column of the designation. The principle of this operation will be recognized as a familiar one.

Suitable driving mechanism will be provided for operating the various sensing and associated mechanisms in correct relation to the unwinding of the roll 115 and the winding of the cores corresponding to the cores 123, 124 of the feeding units associated with each station for receiving the sensed record elements and their associated checks.

The method of sorting record elements and their associated checks described with reference to Fig. 11 is given by way of example only, it being appreciated that a feeding mechanism according to the present invention could be associated with any other sorting mechanism as may be desired.

In the description, one method of sorting and feeding record elements and/or associated articles of which they record the data on or pertaining thereto, has been disclosed, namely a roll of material between adjacent layers of which such record elements and/or articles are folded. It should be appreciated, however, that the band of material instead of being stored in the form of a roll can be stored in any other suitable manner so long as the record elements or/and articles are located between adjacent folds thereof. For instance, such a band of material can be stored in a zig-zag form within a suitable container and unfolded in such manner as to discharge the record elements and/or articles in associated relation from between the adjacent folds.

The band or bands between which the articles or record elements are stored have hereinbefore been described as being of a width somewhat greater than that of the articles or record elements so that the side edges thereof extend beyond the side edges of the articles or record elements. Such a provision is not essential however and if desired such band or bands of material could be of less width than the articles or record elements which are stored thereby so that the edges of the articles or record elements would extend beyond the edges of such band or bands. As a specific example of such construction it would be stated that each band could comprise a fairly narrow tape which could be located centrally of the articles that is in line with their longitudinal axes. Such tape could if desired be provided with a plurality of cross strips of thin metal stiff cardboard or other fairly rigid material, spaced apart longitudinally of the tape. If desired they could be spaced apart at such distances as to correspond with the zones occupied by the articles or record elements. The strips could be of a length somewhat greater than the width of the articles or record elements.

If two series of articles and record elements respectively are to be stored in a single roll side by side such roll could consist of two tapes spaced apart and connected together by cross strips spaced longitudinally thereof. The tapes could be so spaced that they could be located centrally of the two series of articles respectively, that is in line with their longitudinal axes. The cross strips if desired could extend beyond the outer edges of the two tapes and if desired they could be of such length that they would project beyond the edges of the articles and record elements when wound up in the roll. They could be made of thin metal, stiff cardboard or other fairly rigid material.

If desired, provision could be made for driving or registering the roll by means adapted to engage the cross strips for instance adjacent their outer edges.

In all cases, whether the band or bands are wider or narrower than the articles or record elements, the cores on which they are wound could be provided with flanges to ensure that the rolls are correctly wound with their side edges in the same radial planes and to ensure that they are maintained in such condition.

What I claim is:—

1. The method of effecting the feeding to record controlled statistical or accounting machines of elements of a pliable nature which consists in supporting such elements between adjacent convolutions of a band of material in associated relationship with mechanical records of data upon said elements and ejecting such elements from said band of material by unwinding said band progressively.

2. The method of effecting the feeding to record controlled statistical or accounting machines of elements of a pliable nature in a plurality of series which consists in supporting such elements between adjacent convolutions of a band of material in associated relationship with mechanical records of data upon said elements and ejecting the elements of such series from said band of material by unwinding said band progressively.

3. The method of effecting the feeding to record controlled statistical or accounting machines of elements of a pliable nature in a plurality of series which consists in supporting such elements between adjacent folds of a plurality of bands of material in associated relationship with mechanical records of data upon said elements and ejecting the elements of such series from said bands of material by unfolding such bands progressively.

4. The method of effecting the feeding to record controlled statistical or accounting machines of elements of a pliable nature which consists in supporting such elements between the adjacent layers of a band of material in rolled form in associated relationship with mechanical records of data upon said elements and ejecting such elements from said band of material by unrolling said band.

5. The method of effecting the feeding to record controlled statistical or accounting machines of elements of a pliable nature in a plurality of series which consists in supporting such elements between adjacent layers of a band of material in the form of a roll in associated relationship with mechanical records of data upon said elements and ejecting the elements of such series from said band of material by unrolling said band.

6. The method of effecting the feeding to record controlled statistical or accounting machines of elements of a pliable nature in a plurality of series which consists in supporting such elements between adjacent layers of a plurality of bands of material arranged respectively in the form of rolls in associated relationship with mechanical records of data upon said elements and ejecting the elements of such series from said plurality of bands of material by unrolling said bands.

7. The method of controlling accounting, sorting and similar operations on articles such as checks which are not adapted to be provided with mechanical records thereon, which consists in providing a mechanical record of the data on or pertaining to each article on a member separate and distinct from such article and associating the articles with their respective records in such a manner that they can be fed in associated relation to a record controlled statistical or accounting machine.

8. The method of effecting the feeding to record controlled statistical or accounting machines of a series of elements containing mechanical records which are adapted to control the operation of the machine, which consists in supporting said series of elements between adjacent convolutions of a band of material and ejecting said series of elements from said band of material for feeding them to the machine by unwinding said band of material progressively.

9. The method of effecting the feeding to record controlled statistical or accounting machines of a series of articles such as checks which are not adapted to be provided with mechanical records thereon, which consists in supporting such articles between adjacent convolutions of a band of material and feeding forward such articles by unwinding said band of material progressively, such unwinding being effected in associated relation with means for feeding forward to the machine a series of mechanical records respectively of the data on or pertaining to the series of articles.

10. The method of effecting the feeding to record controlled statistical or accounting machines of a series of articles such as checks which are not adapted to be provided with mechanical records thereon, and a series of mechanical records respectively of the data on or pertaining to the articles which consists in supporting said articles between adjacent convolutions of a band of material, supporting such mechanical records between adjacent convolutions of a band of material, and feeding forward such articles and such records by unwinding said bands of material progressively.

11. Feeding mechanism for record controlled statistical or accounting machines for feeding elements of a pliable nature comprising a band of material adapted to support such elements and in associated relation thereto mechanical records of data upon said elements between adjacent convolutions thereof and means adapted to unwind said band of material progressively to effect the ejection of said elements and records from said band.

12. Feeding mechanism for record controlled statistical or accounting machines for feeding elements of a pliable nature in a plurality of series comprising a band of material adapted to support such elements and in associated relation thereto mechanical records of data upon said elements between adjacent convolutions thereof and means adapted to unwind said band of material progressively to effect the ejection of the elements and records of such series from said band of material.

13. Feeding mechanism for record controlled statistical or accounting machines for feeding elements of a pliable nature in a plurality of series comprising a plurality of bands of material adapted to support such elements and in associated relation thereto mechanical records of data upon said elements between adjacent folds thereof and means adapted to unfold said bands of material progressively to effect the ejection of the elements and records of such series from said bands.

14. Feeding mechanism for record controlled statistical or accounting machines for feeding elements of a pliable nature comprising a band of material in the form of a roll adapted to support such elements and in associated relation thereto mechanical records of data upon said elements between adjacent layers thereof and means adapted to unroll said band of material to effect the ejection of said elements and records from said band.

15. Feeding mechanism for record controlled statistical or accounting machines for feeding elements of a pliable nature in a plurality of series comprising a band of material in the form of a roll adapted to support such elements and in associated relation thereto mechanical records of data upon said elements between adjacent layers thereof and means adapted to unroll said band of material to effect the ejection of the elements and the associated records of such series from said band.

16. Feeding mechanism for record controlled statistical or accounting machines for feeding elements of a pliable nature in a plurality of series comprising a plurality of bands of material each of which is in the form of a roll, such rolls being adapted to support such elements and in associated relation thereto mechanical records of data upon said elements between adjacent layers thereof, and means adapted to unroll said bands of material to effect the ejection of the elements of such series from said bands.

17. Feeding mechanism for record controlled statistical or accounting machines for feeding elements of a pliable nature comprising a band of material, a core on which such band of material is adapted to be wound, a roller about which the band of material is adapted to pass, and means for maintaining the roll wound on the core in yielding engagement with said roller whereby upon rotation of said roller the winding or unwinding of said roll will be effected.

18. Feeding mechanism for record controlled statistical or accounting machines for feeding elements of a pliable nature comprising a band of material, a core on which such band of material is adapted to be wound, a roller about which the band of material is adapted to pass, a second roller associated with said first mentioned roller and adapted to maintain the band of material in frictional engagement therewith and means for maintaining the roll wound on the core in yielding engagement with said roller whereby upon rotation of said roller the winding or unwinding of said roll will be effected.

19. Feeding mechanism for record controlled statistical or accounting machines for feeding elements of a pliable nature comprising a band of material, a core on which such band of material is adapted to be wound, a roller about which the band of material is adapted to pass, means for maintaining the roll wound on the core in yielding engagement with said roller whereby upon rotation of said roller the winding or unwinding of said roll will be effected, a second core about which said band of material is adapted to be wound from the roll on said first mentioned core, a roller about which the band of material is adapted to pass and means for maintaining the roll on said second mentioned core in yielding engagement with said roller.

20. Feeding mechanism for record controlled statistical or accounting machines for feeding elements of a pliable nature comprising a band of material, a core on which such band of material is adapted to be wound, a roller about which the band of material is adapted to pass, a second roller associated with said first mentioned roller and adapted to maintain the band of material in frictional engagement therewith, means for maintaining the roll wound on the core in yielding engagement with said first mentioned roller whereby upon rotation of said roller the winding or unwinding of said roll will be effected, a second core about which said band of material is adapted to be wound from the roll on said first mentioned core, a third roller about which the band of material is adapted to pass, a fourth roller associated with said third roller and adapted to maintain the band of material in frictional engagement with said third roller and means for maintaining the roll on said second mentioned core in yielding engagement with said third roller.

21. Feeding mechanism for record controlled statistical or accounting machines for feeding elements of a pliable nature comprising two pairs of pivoted arms, a core rotatably mounted adjacent the outer ends of each pair of pivoted arms, a band of material connected at its opposite ends respectively to said cores and adapted to be wound into rolls on said cores, a roller associated with each core, a second roller associated with each of said first mentioned rollers which is adapted to maintain the band of material in frictional engagement with such roller, and resilient means acting upon said pair of arms adapted to maintain the roll on each core in yielding engagement with its associated roller whereby on rotation of one of said rollers the band of material will be wound on one of said cores and unwound from the other of said cores.

22. Feeding mechanism for record controlled statistical or accounting machines for feeding elements of a pliable nature comprising two pairs of pivoted arms, a core rotatably mounted adjacent the outer ends of each pair of pivoted arms, a band of material connected at its opposite ends respectively to said cores and adapted to be wound into rolls on said cores, a roller associated with each core, a second roller associated with each of said first mentioned rollers which is adapted to maintain the band of material in frictional engagement with such roller, resilient means acting upon said pair of arms adapted to maintain the roll on each core in yielding engagement with its associated roller whereby on rotation of one of said rollers the band of material will be wound on one of said cores and unwound from the other of said cores, a casing within which said cores and their associated rollers are adapted to be mounted and means for locking said casing to a base.

In testimony whereof I affix my signature.

JAMES LAST.